United States Patent [19]

Peterson

[11] 3,719,794
[45] March 6, 1973

[54] CONTAINER SUPPORTING PEDESTAL FOR CARGO-CARRYING VEHICLES

[76] Inventor: Stephen G. Peterson, 6038 Westwood Terrace, Norfolk, Va. 23508

[22] Filed: July 22, 1969

[21] Appl. No.: 843,360

[52] U.S. Cl. ............................105/366 D, 248/361 R
[51] Int. Cl. .........B61d 3/06, B61d 17/10, B65j 1/22
[58] Field of Search ..............105/366 D, 366 C, 377; 248/119 R, 361 R; 267/155

[56] References Cited

UNITED STATES PATENTS

| 2,750,185 | 6/1956 | Moore | 267/155 |
| 3,022,536 | 2/1962 | Floehr | 105/377 |
| 3,431,868 | 3/1969 | Cordani et al. | 105/366 D |
| 3,389,664 | 6/1968 | Pulcrano et al. | 105/366 D |
| 3,556,019 | 1/1971 | Schwiebert | 105/366 D |
| 3,565,013 | 2/1971 | Terlecky | 105/366 D |

Primary Examiner—Drayton E. Hoffman
Attorney—Scrivener, Parker, Scrivener & Clarke

[57] ABSTRACT

A cargo-carrying vehicle having a plurality of pedestals adjustably arranged on the bed of the vehicle for supporting the corners of a cargo container, the pedestals being constructed and arranged with respect to the bed as to be folded in a retracted position relative thereto so as to be substantially flush with the vehicle bed and thus provide a smooth surface for the loading and unloading of wheeled vehicles.

2 Claims, 4 Drawing Figures

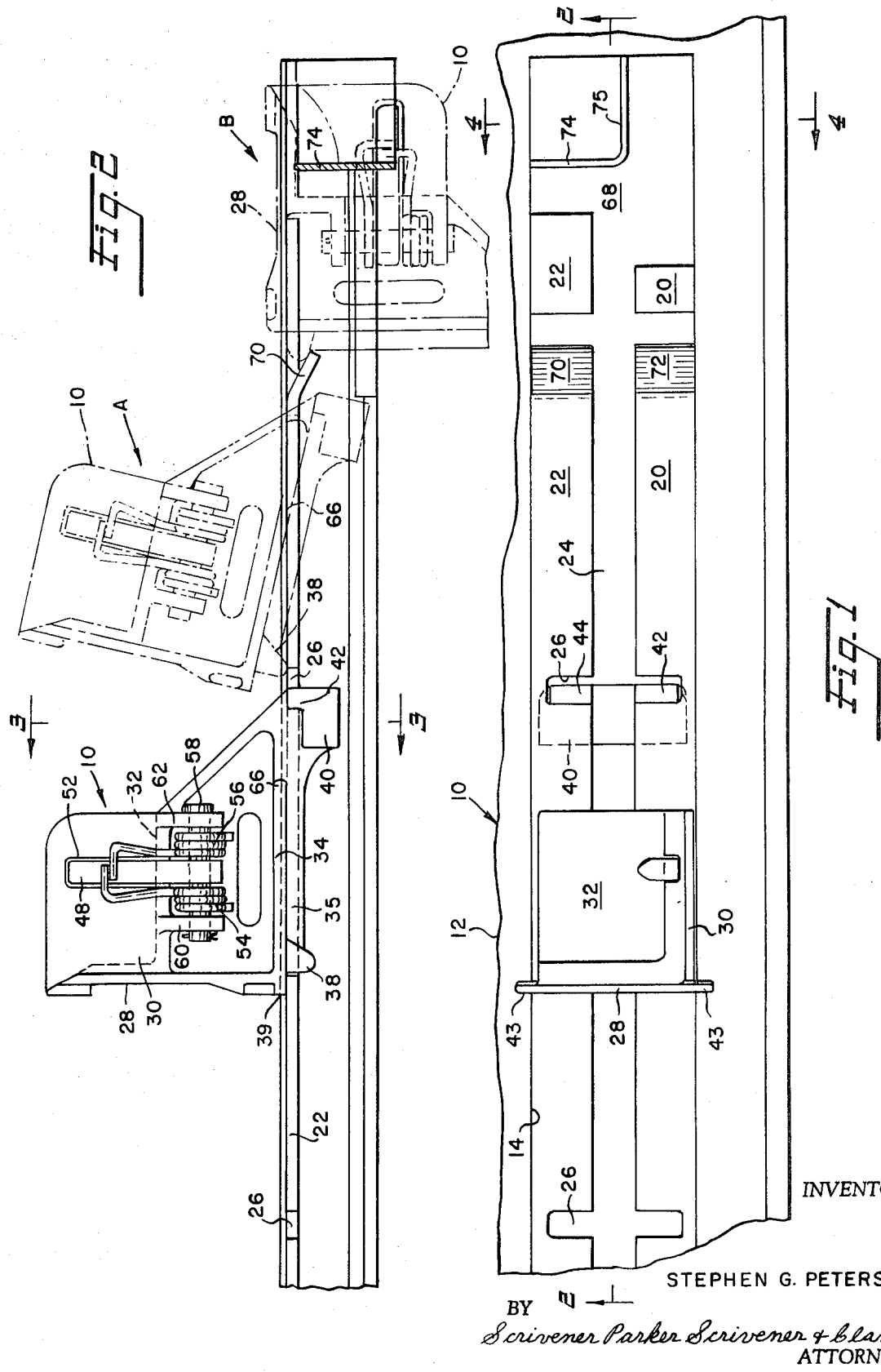

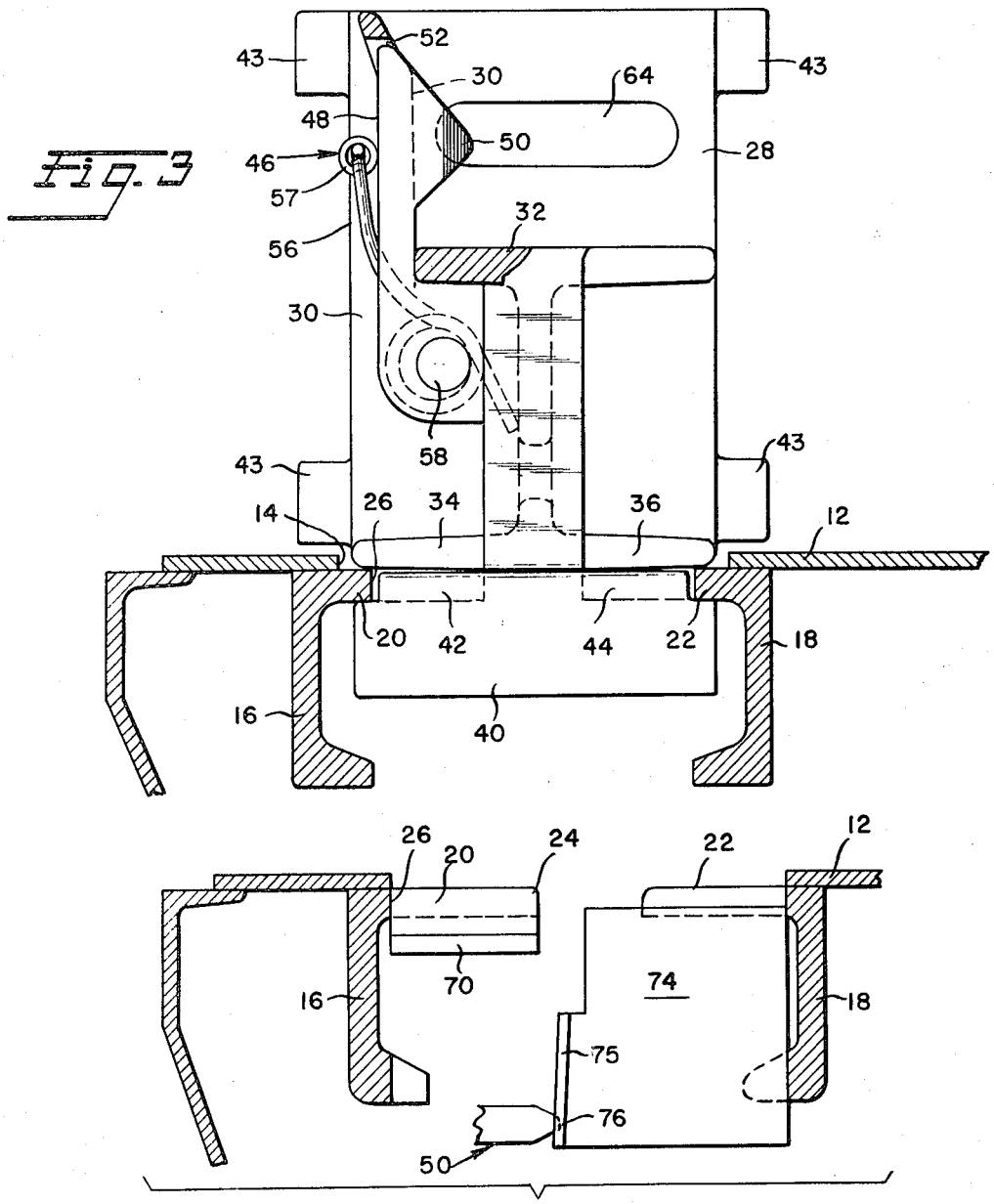

CONTAINER SUPPORTING PEDESTAL FOR CARGO-CARRYING VEHICLES

DETAILED DESCRIPTION

This invention relates to cargo container supporting pedestals adjustably mounted on the floor or bed of a vehicle and adapted to support the corners of such containers.

One of the objects of the invention is to provide a novel container supporting pedestal construction which is adjustably mounted with respect to the bed of a vehicle, the arrangement being such that the pedestals may be readily adjusted to support the corners of containers of varying lengths.

Another object of the invention comprehends the provision of an automatically operable latch associated with each pedestal and cooperating with the corners of the container for securely latching the container in its supported position.

A further object is to provide in a pedestal construction of the above character, a novel arrangement whereby the pedestal may be readily moved along the supporting track on the vehicle to a position whereby the pedestal may be folded to a retracted position and thus present a relatively smooth surface for the loading and unloading of wheeled vehicles.

A still further object resides in the use of a novel construction whereby the pedestal is releasably latched in its folded or retracted position.

Still another object is to provide a pedestal of the foregoing type which is rugged in construction and cooperates with its supporting structure on the bed of the cargo-carrying vehicle in such a manner as to provide a firm and rigid support for the container irrespective of the forces developed during accelerations and decelerations of the vehicle.

Other objects and novel features of the invention will appear more fully hereinafter from a consideration of the following detailed description when taken in connection with the accompanying drawings illustrating one form of the invention. It is to be understood however, that the drawings are utilized for purposes of illustration only and are not to be taken as a definition of the limits of the invention, reference being had for this purpose to the appended claims.

Referring to the drawings wherein similar reference characters refer to similar parts throughout the several views:

FIG. 1 is a partial plan view of a portion of the bed or floor of a cargo-carrying vehicle illustrating the pedestal of the present invention in an adjusted position for supporting one corner of a cargo container;

FIG. 2 is a side view of the construction illustrated in FIG. 1, the broken line indications showing the pedestal as it is moved from erect supporting position to a retracted or fold-away position;

FIG. 3 is a sectional view taken substantially along line 3—3 of FIG. 2, and

FIG. 4 is a partial view taken along line 4—4 of FIG. 1 and illustrates the latched condition of the pedestal when in fold-away position.

Referring more particularly to FIGS. 1, 3 and 4, the present invention is illustrated therein as including a cargo-supporting pedestal 10 which is adjustably mounted for back and forth movement along a bed or floor 12 of a cargo-carrying vehicle, the floor 12 being provided with a longitudinally extending opening 14 and having a pair of pedestal supporting angles 16 and 18 secured thereto, the latter having supporting flanges 20 and 22 which are spaced apart to form a longitudinally extending slot 24. Cross slots 26 are provided in the flanges 20 and 22 and these are spaced along the length of the latter for positioning the pedestals to accommodate containers of different lengths.

As shown in FIGS. 1–3, a pedestal 10 is formed with a rear wall 28, a side wall 30 and a base 32, these parts together forming a pocket for supporting the corner of a container. It will be understood that the supporting angles 16 and 18 are of sufficient length to accommodate at least a pair of spaced-apart pedestals along one side edge of the bed 12 and that the pedestal supporting structure shown in FIGS. 1 and 2 is duplicated along the other side edge of the bed 12 so that at least four pedestals are provided to support the four corners of a container.

In order to support the pedestal for adjustable movement along the flanges 20 and 22, a pair of laterally extending base supports 34 and 36 are provided which respectively engage the flanges 20 and 22. A rib 35 extends from the rear lug 38 to the stabilizer bar 40. The rib 35 fits into the slot 24 and prevents twisting or lateral movement of the pedestal. A rear lug 38 is adapted to be located in one of the cross slots 26 and a shear or stabilizer bar 40 is carried by the forward portion of the pedestal 10 and positioned beneath the flanges 20 and 22, see FIG. 3, the shear bar having upstanding lugs 42, 44 receivable in the slot 26. Due to this construction, the pedestal is securely maintained in its supporting position to provide restraint against longitudinal movement during operation of the vehicle.

Means are provided to limit movement of the pedestal in a counter-clockwise direction, such means comprising the abutment 39 formed as an extension of the base 32. Lugs 43 are provided at the corners of the wall 28 to prevent the pedestal from falling through the opening in the floor 12 when the pedestal is in its retracted position.

Novel means are provided by the present invention for latching the container corner within the pocket formed by the walls 28 and 30 and the base 32. As shown, such means comprises a spring loaded latch mechanism 46 including a latch bar 48 having a rounded nose 50 which is adapted to protrude through an opening 52 in the wall 30, see FIGS. 2 and 3. A pair of torsion springs 54 and 56, mounted upon a shaft 58 supported by ears 60 and 62 are preloaded so that the latch bar is spring-urged to operable position. As shown in FIG. 3, the portion of the torsion spring abutting the wall 28 may be provided with a roller 57 or wear plate to facilitate its operation. Such force is sufficient to securely hold the container corner in position during operation of the vehicle, it being appreciated that due to the rounded nose 50, the latch bar 48 will be automatically engaged and disengaged as the container is placed upon and removed from the pedestal 10. It will be understood that if desired, the container may be provided with a recess for receiving the nose 50 when the container corner is supported by the pedestal.

When it is desired to move the pedestal from one position of adjustment to another, it is only necessary to grasp the rear wall 28 by means of hand slot 64 and rock the pedestal forwardly as shown in the broken line position A in FIG. 2. During this movement, the pedestal 10 will pivot about the rounded edge 66 of the flanges 34, 36 to move the lug 38 out of registry with the cross slot 26, as shown, whereupon the pedestal 10 may be readily moved to another selected position of adjustment, it being understood that during such movement, the edge 66 will slide along the flanges 20 and 22. To facilitate the pivotal movement of the pedestal, the edge 66 is positioned closely adjacent the center of gravity of the pedestal, and as shown in FIG. 2, in substantial alignment with the forward edge of the side wall 30.

A novel construction is provided for permitting the pedestal 10 to be moved to a fold-away or retracted position and includes an arrangement for releasably latching the pedestal in such position. As shown, such construction includes opening 68 which is so shaped as to receive the parts of the pedestal 10 as the latter is moved to the fold-away position shown in broken lines at B in FIG. 2. When retracted, the pedestal 10 is supported at the rear by engagement of the rear lug 38 with support plates 70 and 72 and at the front by engagement of the rear wall 28 with a support plate 74. As shown in FIGS. 1 and 4, the support plate 74 includes a wall 75 having an indentation 76 formed therein for receiving the nose 50 of the latch bar. In this manner, the pedestal 10 is resiliently latched in the fold-away position, thus avoiding any vertical movement thereof during operation of the vehicle. It will also be understood that when in this condition, the pedestal 10 will close the pedestal-receiving wall formed by the opening 68 in order to permit wheeled vehicles to be moved over the bed of the cargo-carrying vehicle without obstruction.

From the foregoing it will be appreciated that the present invention provides a novel container supporting pedestal construction which is arranged for ready adjustment along the bed of a cargo-carrying vehicle to various positions for supporting containers of different lengths depending upon the positioning of the cross slots 26. The provision of the latch mechanism 46 not only securely maintains the container in its supported position but also releasably secures the pedestal in its fold-away position through cooperation between the latch mechanism and the wall 75. The rounded edge 66 of the support flanges 34 and 36 also enables ready pivoting of the pedestal for retraction as well as movement thereof to various positions of adjustments along the flanges 20 and 22.

Other advantages and novel features of the invention will be readily perceived by those skilled in the art and within the terms of the appended claims.

What is claimed is:

1. Pedestal means for supporting at least one corner of a container at a level above the horizontal floor of a cargo-carrying vehicle, said floor containing a continuous longitudinal slot (24), a plurality of longitudinally spaced cross slots (26) in communication with said longitudinal slot, and a well opening (68) at one end of said longitudinal slot, said pedestal means comprising a unitary pedestal housing (10) including a. a lower base portion (34, 36) seated on the upper surface of said floor above said longitudinal slot, said base portion having a rounded forward edge (66);

b. the upper portion of said housing containing orthogonally arranged rear (28), side (30) and bottom (32) walls defining a pocket for supporting a corner of the container;

c. a longitudinal rib (35) extending downwardly from said base portion within and longitudinally of said slot to prevent twisting and lateral movement of said housing relative to the floor, said rib extending longitudinally beyond the forward edge of said base portion;

d. a transverse rear lug (38) extending downwardly from the rear end of said base portion within a first one of said cross slots;

e. a stabilizer bar (40) connected with the forward end of said longitudinal rib and extending laterally therefrom beneath and in engagement with the lower surface of said floor to prevent lateral movement about a longitudinal axis; forward lug means (42, 44) connected with said stabilizer bar and extending upwardly within a second one of said cross slots; and f. said housing being pivotable forwardly about the forward edge of said lower base portion through a first angle of less than 90° toward a tilted position in which the rear lug is elevated from said first cross slot and said forward lug means are lowered from said second cross slot, thereby permitting horizontal displacement of said housing longitudinally of the slot, g. said housing being further forwardly pivotable, when adjacent the well opening, from the tilted position through an angle complementary to said first position toward a retracted position contained completely within the well opening.

2. A pedestal assembly for supporting at least one corner of a container above a cargo-carrying vehicle, comprising a. floor bed means (12) containing a continuous longitudinal slot (24), a plurality of longitudinally-spaced cross slots (26) in communication with said longitudinal slot, and a well opening (68) at one end of said longitudinal slot; and b. a unitary pedestal housing (10) including 1. a lower base portion (34, 36) seated on the upper surface of said floor bed means above said longitudinal and cross slots, said base portion having a rounded forward edge (66);

2. the upper portion of said housing containing orthogonally arranged rear (28), side (30) and bottom (32) walls defining a pocket for supporting a corner of the container, said side wall containing a through opening (52) communicating with said pocket;

3. a longitudinal rib (35) extending downwardly from said base portion within and longitudinally of said slot to prevent twisting and lateral movement of said housing relative to said floor bed means, said rib extending longitudinally beyond the forward edge of said base portion;

4. a transverse rear lug (38) extending downwardly from the rear end of said base portion within a first one of said cross slots;

5. a stabilizer bar (40) connected with the forward end of said longitudinal rib and extending laterally therefrom beneath and in engagement with the lower surface of said floor; and 6. forward lug means (42, 44) connected with said stabilizer bar and extending upwardly within a second one of said cross slots;

c. a latch member (48) pivotally connected with said housing externally of said side wall;

d. spring means (54, 56) biasing said latch member in the direction of said side wall, said latch member having a projection (50) normally extending through said opening for locking engagement with a corresponding recess contained within a corner portion of a container supported on said pedestal;

e. said housing being initially pivotable, in the absence of a container, about said forward edge of said lower base portion to elevate the rear lug from said first cross slot and to lower the forward lug means from the second cross slot, thereby permitting horizontal displacement of said housing longitudinally of the slot toward said well opening, said housing being further pivotable about said forward edge toward a retracted position within said well opening; and f. support plate means (74, 75) rigidly connected beneath said floor bed means and containing a recess (76) for receiving in locking engagement said projection when said pedestal housing is in the retracted position.

* * * * *